(12) United States Patent
Booth (10) Patent No.: US 6,254,237 B1
(45) Date of Patent: Jul. 3, 2001

(54) MULTI-PIXEL MICROLENS ILLUMINATION IN ELECTRONIC DISPLAY PROJECTOR

(76) Inventor: David K. Booth, 11865 SW. Walnut St., Tigard, OR (US) 97223

(*) Notice: Subject to any disclaimer, the term of this patent is extended or adjusted under 35 U.S.C. 154(b) by 0 days.

(21) Appl. No.: 09/302,911

(22) Filed: Apr. 30, 1999

(51) Int. Cl.[7] .................................................. G03B 21/00
(52) U.S. Cl. .............................................. 353/31; 349/62
(58) Field of Search ............................... 359/619; 349/5, 349/61, 62, 110; 353/31, 34, 102

(56) References Cited

U.S. PATENT DOCUMENTS

| | | | |
|---|---|---|---|
| 5,161,042 | 11/1992 | Hamada | 359/41 |
| 5,626,409 | 5/1997 | Nakayama et al. | 353/31 |
| 5,758,940 | * 6/1998 | Ogino et al. | 353/38 |
| 5,777,804 | * 7/1998 | Nakamura et al. | 359/727 |
| 5,836,664 | 11/1998 | Conner et al. | 353/70 |
| 5,852,479 | * 12/1998 | Ueda et al. | 349/9 |
| 5,909,316 | * 6/1999 | Watanabe | 359/619 |

OTHER PUBLICATIONS

Ohata et al., "High–Information–Content Projection Display Based on Reflective LC on Silicon Light Valves," SID 98 Digest, pp. 25–28, 1998.

* cited by examiner

Primary Examiner—Safet Metjahic
Assistant Examiner—E P LeRoux
(74) Attorney, Agent, or Firm—Ipsolon LLP

(57) ABSTRACT

A color liquid crystal display projector has a light source with a radiating element (e.g., arc or incandescent) and a liquid crystal display (LCD). The LCD includes an array of multiple picture elements or pixels that each have separate color component sub-pixels (e.g., red, green and blue). Multiple differently inclined dichroic mirrors angularly separate the light into light beams of different color components. An integrating lens array relay system has a pair of planar lens arrays that form multiple spatially separated images of the angularly-color separated light components. An array of microlenses is positioned adjacent to the LCD. Each microlens is in one-to-one alignment with LCD pixels along at least one dimension and images the spatially separated images upon multiple pixels in at least the one dimension.

22 Claims, 5 Drawing Sheets

MULTI-PIXEL MICROLENS ILLUMINATION IN ELECTRONIC DISPLAY PROJECTOR

FIELD OF THE INVENTION

The present invention relates to electronic display (e.g., LCD) projectors and, in particular, to such a projector with a microlens array that provides small angle illumination of adjacent pixels.

BACKGROUND AND SUMMARY OF THE INVENTION

Color liquid crystal display projectors generate display images and project them onto display screens, typically for viewing by multiple persons or viewers. The display images may be formed by transmitting light from a high-intensity source of polychromatic or white light through an image-forming medium such as a liquid crystal display (LCD).

In projection display applications, light brightness is an important performance feature. U.S. Pat. No. 5,161,042 of Hamada describes a color liquid crystal display projection system that utilizes a sequence of red, green, and blue inclined dichroic color selective mirrors to form angularly color separated color component light beams without the brightness losses caused by conventional color filter mosaics. The separate color component light beams are directed to an array of microlenses each of which converges the light beams onto one picture element aperture of the liquid crystal display.

A disadvantage of such a system is that the angularly color separated color component light beams would typically be implemented with relatively large color separation angles of, for example, 6 degrees per color component channel. While providing relatively efficient color-separated illumination, such large color separation angles can require that the projector projection lens arrangement have a low F-number of f2.5 or less. F-number is a ratio of the pupil or aperture size (e.g., along a horizontal direction) to the focal length of the lens arrangement. Projection lens arrangements with such low F-numbers can be difficult to manufacture and are susceptible to various optical aberrations that can degrade the display image quality.

Accordingly, one implementation of the present invention includes a color liquid crystal display projector having a light source with a radiating element (e.g., arc or incandescent) and a liquid crystal display (LCD). The LCD includes an array of multiple picture elements or pixels that each have separate color component sub-pixels (e.g., red, green and blue). Multiple differently inclined dichroic mirrors angularly separate the light into light beams of different color components. An integrating lens array relay system has a pair of planar lens arrays that form multiple spatially separated images of the angularly-color separated light components. A microlens array positioned adjacent to the LCD images the spatially separated images upon the color component sub-pixels of the LCD.

More specifically, the first planar lens array receives white light and forms in the second lens array color component (i.e., red, green, and blue) images of the light source (i.e., the radiating element). Color component filters may optionally be positioned adjacent the second lens array to filter these color component images, rather than filtering them at the LCD as is conventional and more expensive to implement. The color component light source images formed in the second planar lens array match and are mapped to the color component sub-pixels of the LCD. Each microlens in the microlens array directs light from the multiple spatially separated images into corresponding sub-pixels of multiple ones of the pixels.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
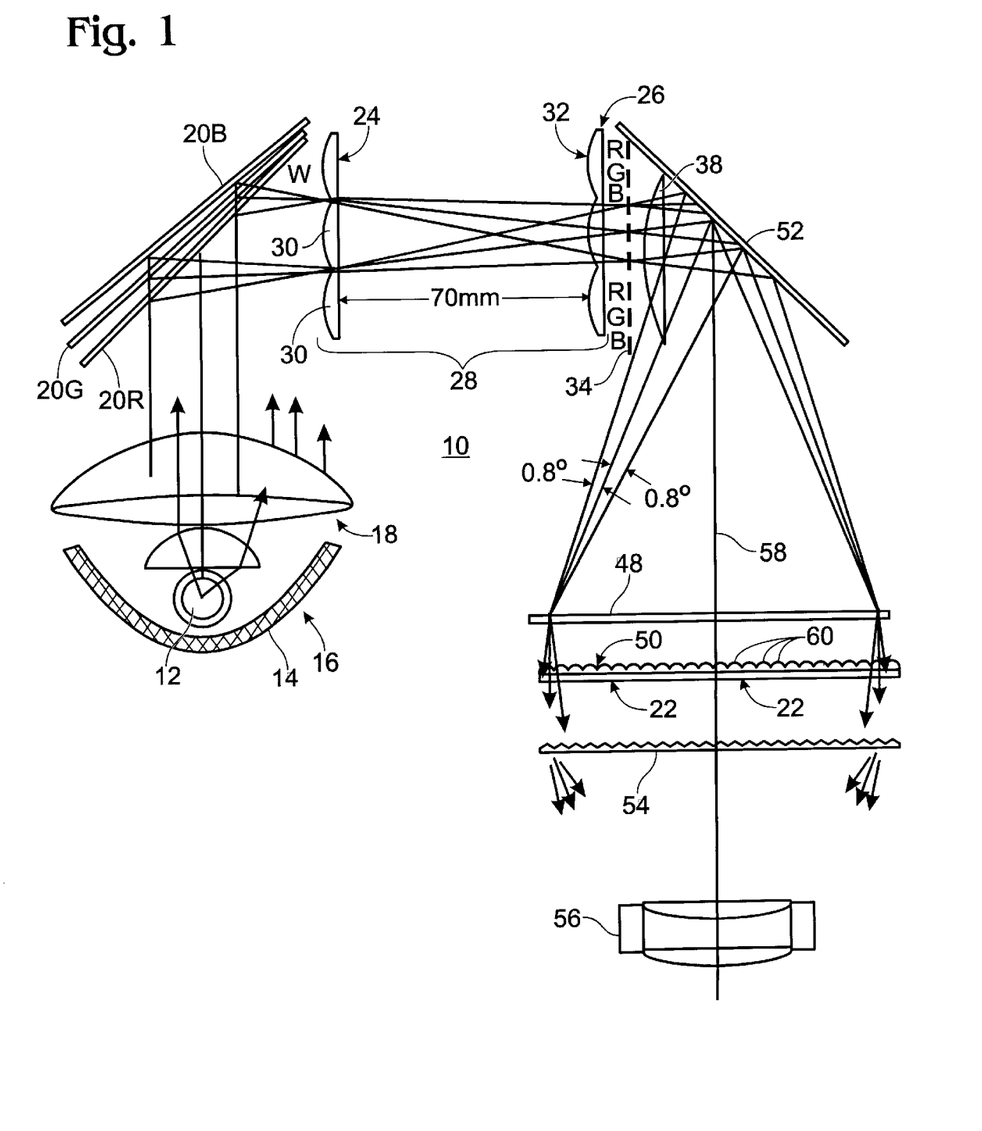
FIG. 1 is a schematic illustration of a single panel color electronic display projector according to the present invention.

FIG. 1 is a schematic illustration of a color electronic (e.g., liquid crystal) projection display system 10 according to the present invention. A white light source 12, such as a metal halide arc lamp, together with a concave (e.g., spherical) concentrating reflector 14, forms an illumination system 16 that directs generally white light into a collimating condenser lens assembly 18. In one implementation, illumination system 16 has a low source angle 17 of ±5 degrees, as described below in greater detail. Light source 12 may be an AC or a DC type metal halide arc lamp, or could alternatively be an incandescent halogen lamp or a xenon lamp. Condenser lens assembly 18 generally collimates the white light and directs it toward an array of differently inclined dichroic mirrors 20R, 20G, and 20B that selectively reflect light beams of wavelength ranges corresponding to red, green and blue, respectively, and transmit the light of other wavelength ranges.

Dichroic mirrors 20R, 20G, and 20B are of conventional multi-layer thin-film types, for example, and receive substantially collimated light. Dichroic mirror 20B reflects visual light having wavelengths shorter than about 500 nm, dichroic mirror 20R reflects visual light having wavelengths greater than about 600 nm, and dichroic mirror 20G reflects visual light having wavelengths in the range of between about 500 nm to 580 nm. Infra-red light may be dissipated by incorporating into dichroic mirrors 20 cold mirror properties, as is known in the art. The different inclines of dichroic mirrors 20R, 20G, and 20B allow them to function together as a high efficiency color separator that directs separate red, green and blue light components toward an electronic display structure such as a liquid crystal display (LCD) 22 (e.g., STN or active matrix display). LCD 22, or any other electronic display, may be transmissive or reflective, with the former illustrated in FIG. 1.

The red, green and blue light components pass through first and second spaced-apart and aligned lens arrays 24 and 26 that function as an integrating lens array relay system 28. Dichroic mirrors 20R, 20G and 20B provide overlapping fields of angularly color separated component illumination to lenslets 30 of array 24. In one implementation, lens arrays 24 and 26 are formed of 3×3 arrangements of lenslets 30 and 32 that are in one-to-one relation to each other, and each has an aspect ratio that matches that of LCD 22. It will be appreciated, however, that lens arrays 24 and 26 may alternatively have lenslet arrangements other than 3×3, as described below in greater detail.

Each lenslet 30 of lens array 24 images the three angularly color separated illumination sources into a corresponding lenslet 32 of lens array 26, thereby providing spatially-color-separated illumination sources from the angualarly separated color components. Each lenslet 32 images the illumination field of lenslet 30 onto LCD 22, which is larger than and relatively farther from lens array 26 than is lens array 24 (e.g., about 420 mm compared to 70 mm). The integrating combination of the many sources makes the illumination more uniform.

Figure 2:
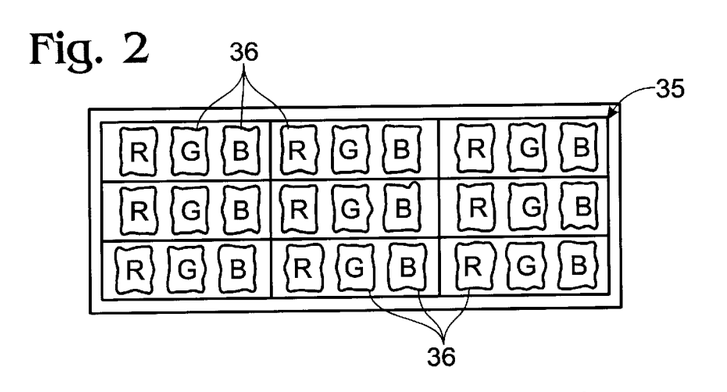
FIG. 2 is a schematic diagram illustrating a color-separated illumination source image provided by a planar integrating lens array of a relay system.

FIG. 2 is a schematic diagram illustrating color-separated illumination source images 36 formed at a planar region 34 at second lens array 26. Color-separated illumination array 35 includes an array of nine each red, green, and blue illumination source images 36, one RGB triad for each lenslet 32. In one implementation, illumination system 16 has a low source angle in at least a lateral direction (horizontal in FIG. 1), but may also have low source angles in a transverse direction as well. An optional array of color filter stripes (not shown) may be positioned at region 34 to optionally provide color purity filtering or to provide good color purity even if LCD 22 does not include color filtering.

Lens array 26 images the illumination fields of lens array 24 toward LCD 22 with a preselected magnification ratio. In one implementation, lenslets 30 and 32 have nominal dimensions of 16.5 mm×22 mm (i.e., 27.5 mm diagonal) and each lenslet is magnified by a factor of 6.5, yielding a diagonal at LCD 22 of 179 mm at a distance of about 400 mm. An illumination field lens 38 converges each of the nine illumination color source triads of images 36 at LCD 22, delivering all nine relayed rectangular fields on top of each other. A Fresnel field lens 48 collimates the average of the source components 36 and directs them to a microlens array 50 positioned immediately before LCD 22. As a result, a color balanced and integrated rectangular illumination field is formed at LCD 22.

Microlens array 50 aligned with and positioned in close proximity (e.g., attached to) LCD 22 may include an array of spherical microlens elements or lenslets 60 that correspond one-to-one with pixels in LCD 22. However, LCD 22 would typically have a non-square aspect ratio that does not match the typically square aspect ratio of pixels on the display. Accordingly, microlens array 50 may alternatively include cylindrical microlens elements 60, with the longitudinal axes aligned vertically one-to-one with columns of pixels and imaging vertical color illumination stripes.

A UV/IR reflector 44 is positioned immediately after illumination system 16 to block ultraviolet and infrared light from LCD 22 and other sensitive components. A fold mirror 52 may optionally be positioned after illumination field lens 38 to fold the illumination light. The light that passes through LCD 22 propagates to a field lens 54, either directly or through a collimating microlens array (not shown), that focuses the light toward a conventional objective projection lens assembly 56 such as a varifocal lens assembly. These components are positioned along an optical axis 58.

Figure 3:
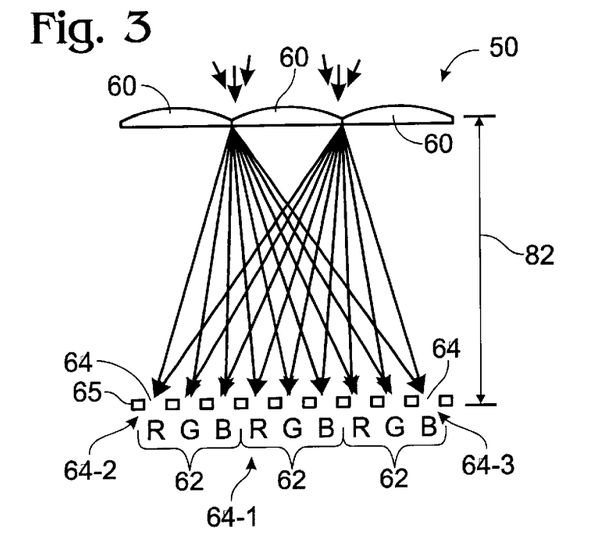
FIG. 3 shows a top sectional view of three microlens elements in a single horizontal or row portion of a LCD microlens array.
Figure 4:
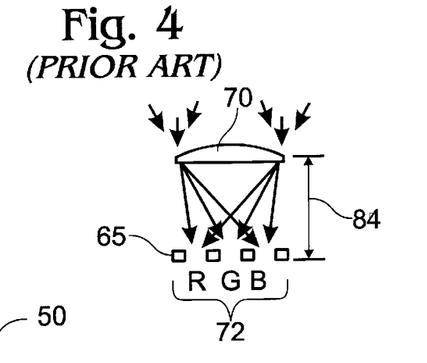
FIG. 4 illustrates imaging characteristics of an exemplary prior art LCD microlens element in relation to a single pixel.

FIG. 3 shows a top sectional view of three microlens elements or lenslets 60 in a single horizontal or row portion of microlens array 50. Microlens elements 60 may be of generally cylindrical or spherical form, with the following description directed primarily to microlens elements 60 being to the latter. Microlens elements 60 are positioned in alignment with optical apertures 64 of red, green, and blue sub-pixels that form picture elements or pixels 62 of LCD 22. Apertures 64 are optical openings in the otherwise opaque face 65 of LCD 22. In one implementation, microlens array 50 includes one spherical microlens element 60 in alignment with each pixel 62 or one cylindrical microlens element 60 for each vertical column of pixels 62. For comparison, FIG. 4 illustrates imaging characteristics of a conventional color separation LCD microlens element 70 in relation to a single pixel 72.

Microlens array 50 functions to direct the red, green, and blue illumination color components 36 into respective corresponding sub-pixel apertures 64R, 64G, and 64B, to improve the illumination efficiency of display projector 10. Each triplet of apertures 64R, 64G, and 64B corresponds to a pixel 62 and is separately controlled by LCD 22 to form a display image as is known in the art. Microlens array 50 may be a separate element or may be integrally formed into LCD 22, such as in combined LCD/microlens array products available from Sony Corporation.

Microlens elements 60 image onto LCD 22 the converged color-separated illumination array 35 received from illumination field lens 38 and collimated by Fresnel field lens 48. Each microlens element 60 directs the color illumination components in the de-magnified color-separated illumination image 35 to multiple respective corresponding apertures 64R, 64G, and 64B. With both the source and color separation angles being de-magnified, microlens elements 60 have low power and work at a long focal length, which is beneficial because high power microlens elements are difficult to manufacture.

FIG. 3 illustrates, for example, illumination from one of the three horizontal rows of de-magnified color-separated illumination image 35. Microlens element 60-1 images the illumination color components 36 of the one horizontal row of de-magnified color-separated illumination image 35 into respective corresponding apertures 64R-1, 64G-1, and 64B-1, 64R-2, 64G-2, and 64B-2, and 64R-3, 64G-3, and 64B-3. It will be appreciated, however, that microlens element 60-1, as well as each of the other microlens elements 60 in array 50, would similarly image the remaining two rows of illumination color components 36 of de-magnified color-separated illumination image 35 onto corresponding apertures 64 vertically above and below.

This implementation illustrates that illumination from one microlens element (e.g., 60-1) of microlens array 50 is directed to multiple adjacent pixels 62, specifically a 3×3 array. In contrast to the multi-pixel illumination provided by microlens elements 60 and integrating lens array relay system 28, conventional LCD microlens element 70 directs illumination to only one pixel 72 (in a spherical implementation) or a single column of pixels 72 (in a cylindrical implementation). Moreover, it will be appreciated that the spherical and cylindrical implementations could alternatively be implemented as aspherics.

With microlens elements 60 of a generally spherical form, illumination from one microlens element (e.g., 60-1) is diverged among multiple horizontally adjacent pixels 62 and multiple vertically adjacent pixels 62 (e.g., 3×3 arrays of pixels 62). In other implementations, for example, the microlens arrays of integrating lens relay system 28 have asymmetric microlens arrangements (e.g., 4×3). In such an implementation, a microlens element 60 may diverge illumination to an array of pixels 62 having horizontal and vertical dimensions that correspond to the array dimensions of the integrating lens relay system 28 (e.g., 4×3 arrays of pixels 62).

With microlens elements 60 of a generally cylindrical form in which the cylindrical axis extends in a vertical direction, illumination from one microlens element (e.g., 60-1) is diverged among multiple horizontally or laterally adjacent pixels 62, as described above with reference to microlens elements 60 of a generally spherical form. In contrast, the illumination is directed to the multiple vertically adjacent pixels 62 in direct alignment with the cylindrical microlens elements 60 in a more random, striped image.

Microlens elements 60 have a focal length 82 relative to pixels 62 that allow longer focal lengths than conventional art. With a given focal length-to-pixel size ratio of X, a similar 3-column or 3×3 implementation of the present invention can triple the focal length, thereby requiring only ⅓ the optical power. Such a reduction in optical power can be particularly beneficial in the microlens arrays of small (e.g., about 40 mm diagonal) LCDs in which the microlens elements operate with refractive index differences of as small as 0.15. For a given illumination design, therefore, a 3-column or 3×3 implementation of the present invention can also reduce the F-number requirements of projection lens 56. F-number is a ratio of the pupil or aperture size (e.g., along a horizontal direction) to the focal length of the lens element and can be a major difficulty with some conventional LCD microlens systems. Microlens elements 60 with such long focal lengths can be manufactured with relatively few optical aberrations and are facilitated in part by the source size reduction of the color elements provided by the demagnification of integrating lens array relay system 28.

Two aspects of such long focal length working distances are that they can allow smaller poly-Si LCDs to have non-embedded microlens arrays and can allow larger LCDs (e.g., similar to the type employed in laptop computers) to have microlens arrays added externally. In the latter case, the expensive color filters that are typically included on the LCDs could be omitted.

Figure 5:
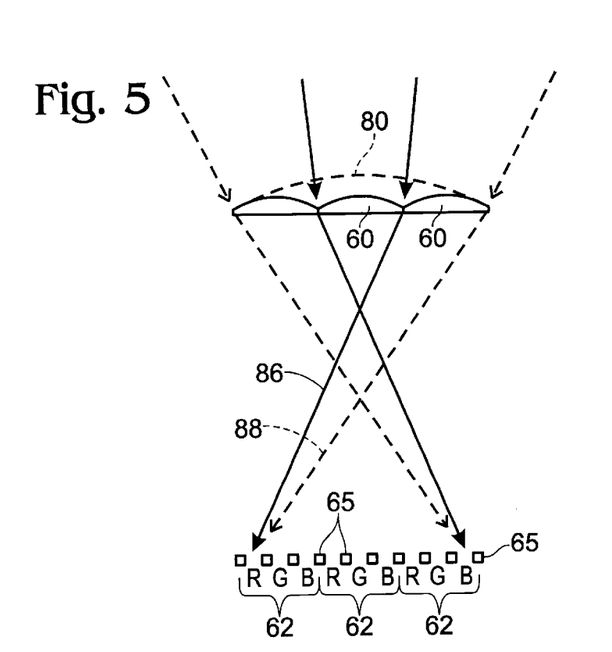
FIG. 5 is an illustration comparing extreme light rays passing through LCD microlens elements according to the present invention and passing through a model microlens element representing a scaled prior art microlens element.

FIG. 5 is an illustration comparing microlens elements 60 to a model microlens element 80 representing conventional microlens element 70 scaled to the focal length 82 of microlens elements 60. In this illustration, conventional microlens element 70 would typically have a focal length 84 (FIG. 4) of about one-third focal length 82 of microlens elements 60. Exemplary extreme light rays 86 and 88 are illustrated to show the greatest angular extent over which respective microlens elements 60 and 80 would be required to focus illuminating light. This illustration shows that extreme light ray 86 of multiple pixel illumination of display system 10 has an angle that is only about ⅔ the angle of extreme ray 88 (as a small angle approximation).

Figure 6:
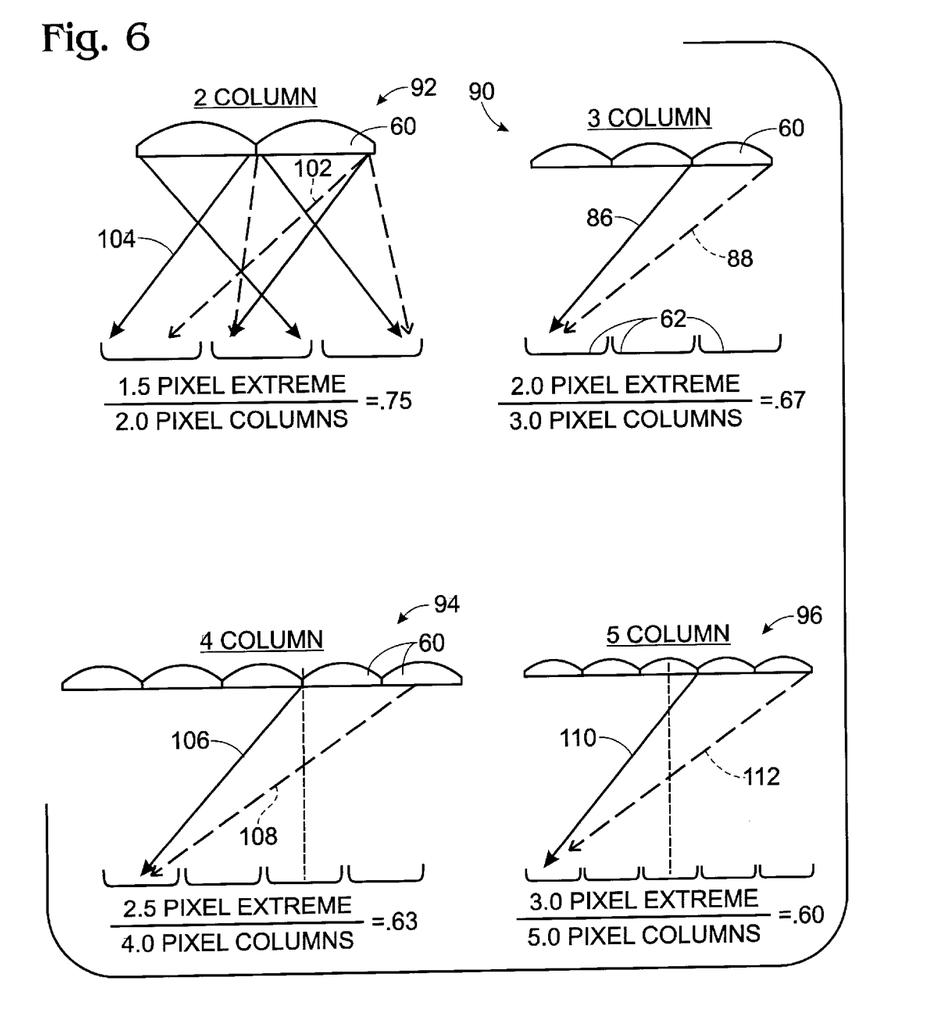
FIG. 6 shows illustrations of the relative advantages of different arrangements of spatially separated illumination in terms of the corresponding numbers of microlens elements and pixels.

FIG. 6 shows illustrations 90, 92, 94, and 96 of the relative advantages of different arrangements of lenslets 30 and 32 in lens arrays 24 and 26 in terms of the corresponding numbers of microlens elements 60 and pixels 62. Illustration 90 represents the same 3-lens arrangement described with reference to FIGS. 1, 3, and 5. The different illustrations refer to different numbers of columns, or cylindrical microlens elements 60, which are applicable to the depicted one-dimensional views. It will be appreciated, however, that these illustrations are similarly applicable the spherical microlens element 60, but with a two-dimensional effect.

Illustration 92 represents a 2-lens arrangement in which the spatially-separated illumination sources are provided to two adjacent microlens elements 60. The resulting 1.5 pixel divergence of an extreme angle ray 102 compares to a 2 pixel divergence of an extreme angle ray 104 of a comparable single microlens. The 0.75 ratio represents a ¼ reduction in the angular extent of extreme angle ray 102.

Illustration 94 represents a 4-lens arrangement in which the spatially-separated illumination sources are provided to four adjacent microlens elements 60. The resulting 2.5 pixel divergence of an extreme angle ray 106 compares to a 4 pixel divergence of an extreme angle ray 108 of a comparable single microlens. The 0.63 ratio corresponds to the reduction in the angular extent of extreme angle ray 106.

Illustration 96 represents a 5-lens arrangement in which the spatially-separated illumination sources are provided to five adjacent microlens elements 60. The resulting 3 pixel divergence of an extreme angle ray 110 compares to a 5 pixel divergence of an extreme angle ray 112 of a comparable single microlens. The 0.6 ratio r corresponds to the reduction in the angular extent of extreme angle ray 110.

With reference to FIG. 5, the relatively lower magnitude angle for extreme ray 86 allows projection lens 56 to be designed with a higher F-number than conventional systems with comparable display area. The relatively higher F-number of microlens elements 60 means that they have less optical power and hence fewer optical aberrations.

The implementation referenced above with lenslets 32 of lens array 26 having widths of 22 mm yields 7.3 mm separations between adjacent color sources. With the illustrated distance of 420 mm between lens array 26 and LCD 22, the angular separation of color sources (in air) is about 1 degree. This is sometimes called color separation angle. In the illustration of FIG. 5, a two-pixel, six-color separation microlens extreme ray 86 left-to-right, and a similar up-down vertical separation, an F3.6 projection lens 56 would be suitable. At a color separation of only 1.2 and 1.5 degrees, projection lens 56 would require F-numbers of F2.8 and F2.2, respectively. This compares favorably with F1.5 projection lenses employed in some projectors.

Figure 7:
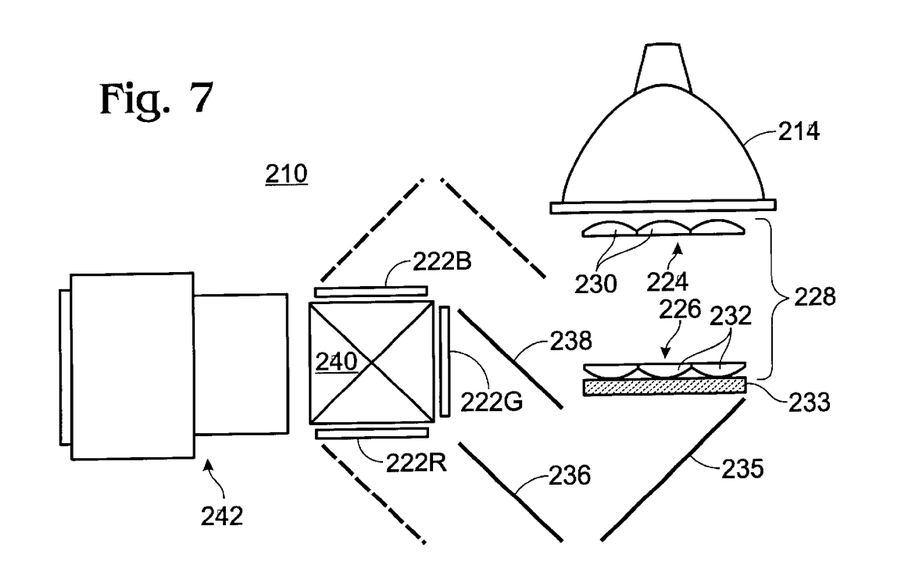
FIG. 7 is a schematic illustration of one channel of a three-path color projector according to the present invention.

FIG. 7 is a schematic illustration of one color channel (e.g., green) of a three-path color projector 210 according to the present invention. Projector 210 includes three transmissive electronic displays (e.g., LCDs 222R, 222G, and 222B) that separately control red, green, and blue image color components. The following description is similarly applicable to the other color channels (e.g., red and blue) of projector 210.

A white light source and parabolic reflector 214 direct generally white collimated light through first and second spaced-apart and aligned lens arrays 224 and 226 that function as an integrating lens array relay system 228. In one implementation, lens arrays 224 and 226 are formed of 3×3 arrangements of lenslets 230 and 232 that are in one-to-one relation to each other, and each has an aspect ratio that matches that of LCD 222G. As described above, lens arrays 224 and 226 of integrating lens array relay system 228 also function to provide spatially separated illumination source images.

A polarizing beam splitter or plate 233 imparts a common polarization on the illumination light, which is directed by a fold mirror 235 to a first color-selective mirror 236. Color-selective mirror 236 passes light of one color (e.g., red) and reflects the other color components of light. A second color-selective mirror 238 passes light of one color (e.g., blue) and reflects the remaining (e.g., green) light to transmissive LCD 222G.

As described above with reference to LCD 22, each of LCDs 222 includes a microlens array (not shown) aligned with and positioned in close proximity (e.g., attached to) each LCD 222. Each microlens array may include, for example, an array of spherical microlens elements that correspond one-to-one with pixels in LCD 222, although the different microlens structures described above with reference to LCD 22 are similarly applicable. Color component images formed by LCDs 222 are combined by a prismatic X-cube 240 and directed to a projection lens 242.

In the implementations described above, spatial separation of the illumination sources, whether monochrome (FIG. 7) or polychromatic (FIGS. 1–3), is provided by lens arrays, as in an integrating lens array relay system. Another aspect of the present invention, however, is that spatial separation of illumination sources can alternatively be provided by multiple separate illumination sources such as LEDs. Virtual multiple light sources can also be generated by methods including polarization, diffraction, dispersion, and faceted reflectors.

Figure 8:
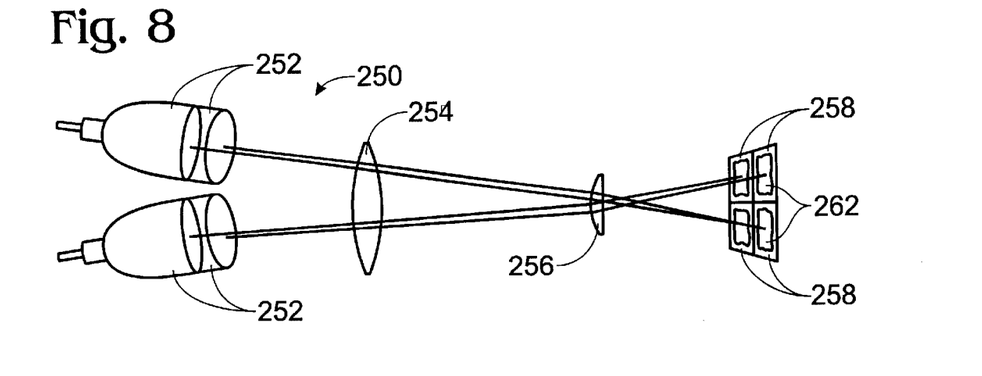
FIG. 8 is a schematic illustration of a spatially separated illumination source system having multiple separate illumination sources.

FIG. 8 is a schematic illustration of a spatially separated illumination source system 250 having multiple separate illumination sources 252. Illumination sources 252 are arranged to provide, for example, a 2×2 array of illumination images. An optical system 254 (shown schematically) images multiple separate illumination sources 252 onto each microlens element 256 (only one shown) of a microlens array (not shown) positioned adjacent and in alignment with an electronic display (e.g., LCD), as described above. Microlens element 256 images the spatially separated images of illumination sources 252 on a corresponding 2×2 array of pixels 258 (FIG. 9) in the LCD.

Figure 9:
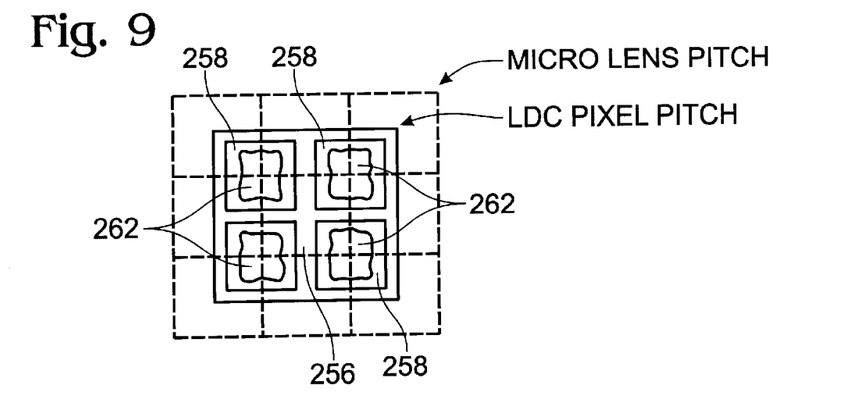
FIG. 9 illustrates a 2×2 array of illumination source images of FIG. 8 being imaged upon corresponding pixels by a microlens element.

FIG. 9 illustrates 2×2 array of illumination source images 262 being imaged upon corresponding pixels 258 by microlens element 256. It will be appreciated the microlens elements 256 are in one-to-one relation to pixels 258, except that the alignment between them is offset to accommodate the 2×2 illumination array provided by sources 252.

Figure 10:
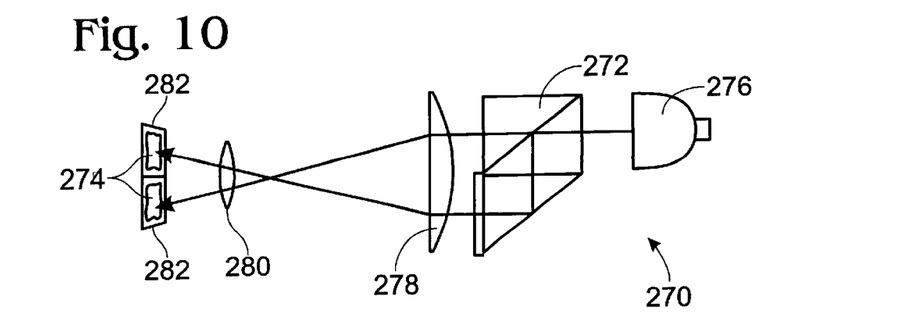
FIG. 10 is a schematic illustration of an alternative spatially separated illumination source system in which a polarizing beam splitter generates multiple virtual source images from a single illumination source.

FIG. 10 is a schematic illustration of an alternative spatially separated illumination source system 270 in which a polarizing beam splitter 272 generates multiple (e.g. 2×1) virtual source images 274 from a single illumination source 276. An optical system 278 (shown schematically) images multiple separate illumination source images 274 onto each microlens element 280 (only one shown) of a microlens array (not shown) positioned adjacent and in alignment with an electronic display (e.g., LCD), as described above. Microlens element 280 images the spatially separated illumination source images 274 on a corresponding 2×1 array of pixels 228 in the LCD.

The description hereinabove is directed by way of example to liquid crystal display projectors. It will be appreciated that the present invention is also applicable to other electronic display projectors in which display images are formed when light from a high-intensity lamp is transmitted through or reflected from an electronic image-forming medium such as a liquid crystal display (LCD), digital micro-mirrors, etc., as is known in the art.

In view of the many possible embodiments to which the principles of our invention may be applied, it should be recognized that the detailed embodiments are illustrative only and should not be taken as limiting the scope of our invention. Rather, the invention includes all such embodiments as may come within the scope and spirit of the following claims and equivalents thereto.

What is claimed is:

1. An electronic display projector having a light source with a radiating region, the improvement comprising:

an electronic display panel with plural picture elements that each has separate color component elements;

plural color separating dichroic mirrors for separating the light into a plurality of coincident angularly-color separated light components;

an integrating lens array relay system having first and second planar lens arrays that form plural spatially separated images that each has plural spatially separated color components; and a microlens array that has plural microlens elements and is positioned adjacent the electronic display panel, each of the microlens elements imaging the plural spatially separated color components of the plural spatially separated images onto plural corresponding color component elements of the picture elements.

2. The projector of claim 1 in which the plural picture elements onto which the plural spatially separated images are imaged are laterally adjacent each other.

3. The projector of claim 1 in which the plural spatially separated images each include separate images of the plural light color components.

4. The projector of claim 1 in which the first and second planar lens arrays have respective planar arrays of lens elements that are in one-to-one alignment with each other.

5. The projector of claim 1 in which the first and second planar lens arrays include at least three lens elements each along at least one dimension of each lens array.

6. The projector of claim 1 in which the first and second planar lens arrays are matched 3×3 arrays of lens elements.

7. The projector of claim 1 further comprising a projection lens having an F-number of between F3 and F5.

8. The projector of claim 7 in which the projection lens has an F-number of between F3.7 and F4.

9. The projector of claim 1 in which the angularly-color separated light components have angular color separations at the microlens array of between 0.8 and 1.5 degrees.

10. The projector of claim 1 in which the plural spatially separated images of the angularly-color separated light components are formed adjacent the second planar lens array, the projector further comprising a color filter arrangement positioned adjacent the second planar lens array to filter the spatially separated images of the angularly-color separated light components.

11. The projector of claim 10 not including a color filter arrangement positioned adjacent the electronic display.

12. In an electronic display projector that provides illumination light as a plurality of coincident color separated light components and includes a display panel with an array of pixels each of which has separate color component elements, the improvement comprising:

an integrating relay system of first and second planar lens arrays, each with multiple lens elements that form spatially separate images of the color separated light components; and a microlens array positioned adjacent and in alignment with the display panel, the microlens array including plural microlens elements that are positioned in one-to-one arrangement with the pixels in at least one dimension of the array of pixels and each microlens element illuminating the separate color component elements of each of a plurality of pixels with corresponding ones of the color separated light components.

13. The projector of claim 12 in which the microlens elements each relay the spatially separate images of the illumination source to separate corresponding pixels.

14. The projector of claim 12 in which the illumination source is included in an illumination system with a low source angle in at least one direction.

15. The projector of claim 12 in which the microlens elements are positioned in one-to-one arrangement with the pixels along only one direction of the array of pixels.

16. The projector of claim 12 in which the microlens elements are positioned in one-to-one arrangement with the pixels in two dimensions of the array of pixels.

17. The projector of claim 12 in which separate color component images of the illumination source are provided to the microlens array.

18. The projector of claim 12 further comprising plural color separating dichroic mirrors at different inclination angles for separating light from the illumination source into the plural coincident color separated light components.

19. The projector of claim 12 in which the first and second planar lens arrays have respective planar arrays of lens elements that are in one-to-one alignment with each other.

20. The projector of claim 12 in which the first and second planar lens arrays include at least three lens elements each along at least one dimension of each lens array.

21. The projector of claim 12 in which the first and second planar lens arrays are matched 3×3 arrays of lens elements.

22. In an electronic display projector having an illumination source and a display panel with plural picture elements that each has separate color component elements, the improvement comprising:

plural color separating dichroic mirrors for separating the light into a plurality of coincident angularly-color separated light components; and an integrating lens array relay system having first and second planar lens arrays that form plural spatially separated images that each has plural spatially separated color components that are directed to corresponding separate color component elements of the plural picture elements.

* * * * *